June 21, 1932. J. H. VICTOR 1,864,328
GASKET
Filed March 9, 1931
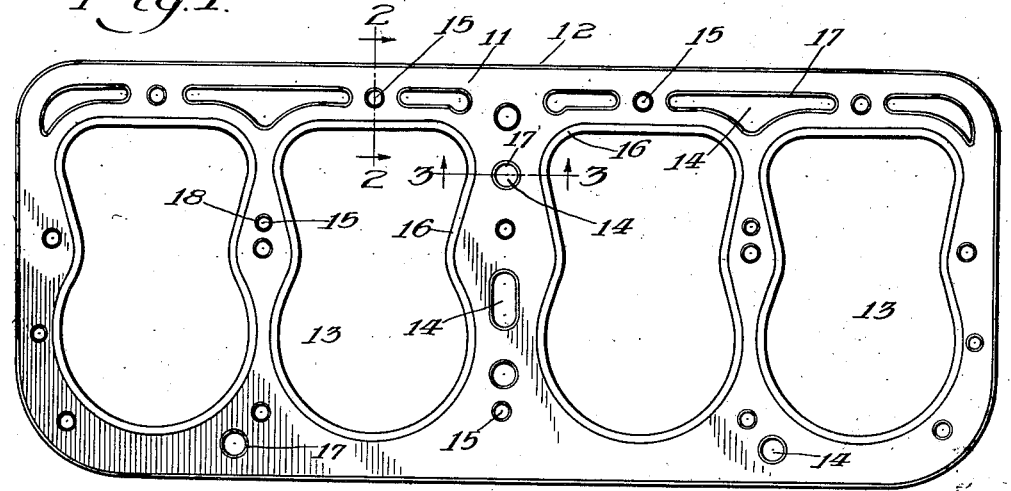
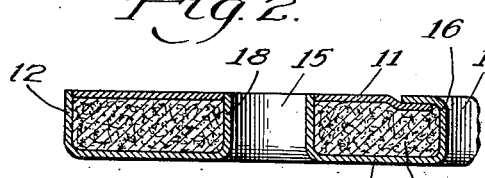
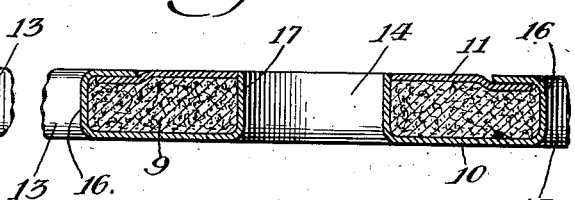
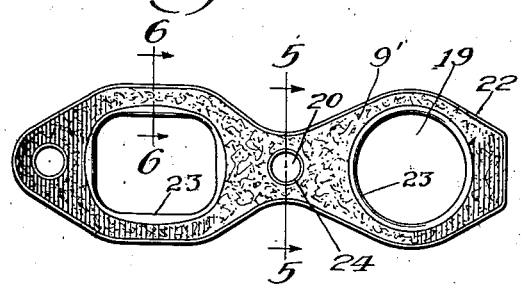
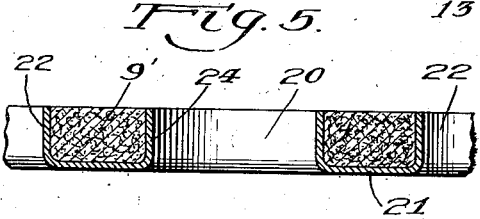
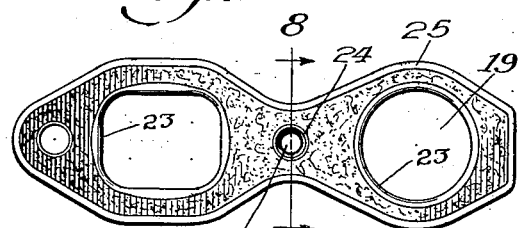
Inventor:
John H. Victor
By Wm. S. Bell
Atty.

Patented June 21, 1932

1,864,328

UNITED STATES PATENT OFFICE

JOHN H. VICTOR, OF EVANSTON, ILLINOIS, ASSIGNOR TO VICTOR MANUFACTURING & GASKET COMPANY, OF CHICAGO, ILLINOIS, A CORPORATION OF ILLINOIS

GASKET

Application filed March 9, 1931. Serial No. 521,143.

This invention relates to gaskets of the kind especially adapted for use in internal combustion engines wherein they are subjected to heat or pressure.

Gaskets of this character usually comprise a body of compressible material having a layer of thin metal on one or both sides thereof with overlapping flanges extending through the port openings, but it has not been customary heretofore to provide flanges at the bolt openings because the edges of the gasket at the bolt openings are not subjected to heat and operating pressure. Consequently, the edges at the bolt openings are often damaged by the bolts during installation, the material of the body is often squeezed into the threads of the bolts when the gasket is being clamped in place, and it is generally difficult to separate the gasket and the bolts without to some extent damaging these edges of the gasket.

The salient object of my invention is to overcome these disadvantages by providing novel flanges of simple form about the bolt openings without materially increasing the cost of manufacture and which will protect the edges of the compressible material and also the edges of the metal layer or layers at these openings against damage.

Another object is to provide an economical flanging about the water port openings of a gasket sufficient to prevent washing away of the body material.

Sometimes a flange is provided about the peripheral edge of a gasket to protect the layers thereof, but this often objectionably increases the thickness of the gasket. A further object is to provide a flange about the peripheral edge of the gasket to protect this edge without increasing the thickness of the gasket.

Still further objects are to provide a gasket wherein one of the metal protecting layers may be in the form of a pan into which the blanked body material may be introduced to thereby provide a more effective seal after installation of the gasket and to prevent leakage past the gasket during the cooling of the parts after use of the engine; to provide a stiffening flange on the gasket to increase the rigidity thereof; and to provide a gasket which may be expeditiously and economically manufactured.

In the selected embodiment of my invention illustrated in the accompanying drawing:

Fig. 1 is a plan view of a cylinder head gasket incorporating my invention;

Fig. 2 is a sectional view taken on the line 2—2 on Fig. 1;

Fig. 3 is a sectional view taken on the line 3—3 on Fig. 1;

Fig. 4 is a plan view of a manifold gasket incorporating my invention;

Fig. 5 is a sectional view taken on the line 5—5 on Fig. 4;

Fig. 6 is a sectional view taken on the line 6—6 on Fig. 4;

Fig. 7 is a plan view of a manifold gasket incorporating a modified form of the invention;

Fig. 8 is a sectional view taken on the line 8—8 on Fig. 7; and

Fig. 9 is a view, similar to Fig. 6, showing a modification of the invention.

In the gasket illustrated in the accompanying drawing, the body 9 is made of a compressible or gasket material such as asbestos, asbestos composition, paper, or the like which may have a reenforcement incorporated therein if desired. This body is suitably shaped for the purpose intended by blanking it from sheet stock and in the embodiment of the invention, as illustrated in Fig. 1, cylinder and water port openings are formed therein as well as bolt openings. On opposite faces of the body are metal protecting layers 10 and 11 preferably made of a soft, yieldable, noncorrosible metal, such as copper. The bottom layer 10 is shaped to provide a pan by having an upstanding peripheral flange 12 formed thereon. The body 9 is placed in this pan with the peripheral edge thereof juxtaposed to this peripheral flange 12. The illustrated gasket includes cylinder port openings 13, water port openings 14, and bolt openings 15. Flanges 16 are formed on the bottom layer 10 which extend through the cylinder openings 13 and overlap the marginal edges of the top layer 11 about the cylinder openings to secure the layers 10 and 11 on the body 9.

Similar overlapping flanges have been provided about the water port openings but the gasket is not subjected to severe heat and pressure at these ports. Sometimes the flanges about the water ports are entirely omitted from the gasket, but these gaskets are not as satisfactory as those having such flanges. In view of this, I provide flanges 17 on the bottom layer 10 which extend through the water port openings 14 past the edges of the body 9 and the top layer 11 to effectively protect these edges. These flanges do not overlap the marginal edges of the top layer but they are sufficient to prevent the water from washing away the material of the body 9 at the openings.

If the edges of the metal layers and the body material are not protected at the bolt openings the threads of the bolts will engage therewith and are liable to damage the edges. When the parts between which the gasket is arranged are clamped in position the material of the body 9 may be squeezed into the threads and when the gasket is separated from bolts during removal it may be damaged to such an extent that re-use of the gasket is impracticable. Furthermore, gaskets are often hung vertically on hooks or nails for display or storage and if the hooks or nails are engaged with unprotected water or bolt openings the edges about the openings are liable to be damaged. If the hooks or nails are engaged with the cylinder openings the flanges about the openings are liable to be so damaged that blowouts will occur. It is an object of my invention to induce the use of bolt openings when gaskets are hung for display or storage and to protect the edges of the bolt openings against damage thereby. Another object is to obviate such disadvantages as above set forth and to this end I provide flanges 18 on the bottom layer 10 which are extended through the bolt openings 15 past the edges of the body 9 and the top layer 11. These flanges serve as guides during the insertion of the bolts, they protect the edges of the body from damage, and when the parts are clamped these flanges prevent the material of the body from being squeezed into the threads of the bolts. Therefore, the gasket may be easily separated from the bolts without damage to the body.

The flanges 12, 13, 17 and 18 are formed on the bottom layer 10 during the blanking thereof. The body 9 is introduced into the pan defined by these flanges, and after this the layer 11 is positioned on the body 9. The flanges 13 are then folded, as described, to interlock the layers and the body and in this manner the flanges 12, 17 and 18 will be retained in position. Since the flanges 12, 17 and 18 are formed on the bottom layer 10 during the blanking thereof and as they do not overlap the top layer 11, the die work is materially simplified. Nevertheless, each of the openings is effectively protected by a flange and damage to the material adjacent the openings is prevented.

At times manifold and sometimes cylinder head and similar gaskets have but one metal layer on the body and such a gasket is illustrated in Fig. 4. This gasket includes port openings 19 and bolt openings 20. The body 9' is blanked into suitable shape from material similar to that employed for the body 9. The metal layer 21 has an upstanding peripheral flange 22 formed thereon whereby a pan-like member is provided into which the body 9' may be introduced. Flanges 23 on layer 21 are passed through the port openings 19 and the marginal edges thereof are folded over the body 9' to interlock the body and the metal layer. In gaskets of this character it has likewise been customary not to provide any protection for the edges of the metal layer and the body at the bolt openings and consequently they have been subject to the disadvantages heretofore set forth. To avoid this, I provide flanges 24 on the layer 21 which extend through the bolt openings 20 to thereby effectively protect the edges of the body 9, as previously explained. When there is but one metal layer on the body the flanges 24 are preferably rounded, to flare outwardly at the face of the body not having a metal layer, as illustrated in Fig. 8. This materially increases the protection afforded by such a flange. When no metal layer is provided on one face of the body, this face is treated by applying a suitable compound, such as paraffin, graphite or the like, thereon to protect this face.

It is desirable to increase the rigidity of gaskets against accidental distortion in handling and to this end I provide on a manifold gasket such as illustrated in Figs. 7 and 8, a peripheral reenforcing flange 25 extending outwardly in the plane of the gasket. However, this flange may be folded upon the peripheral margin of the gasket, as indicated at 25', and this will also afford a reenforcement.

The gasket described herein may be economically manufactured since one of the metal layers may be made in the form of a pan with protecting flanges about openings in the gasket not having overlapping flanges. These protecting flanges need only be of a height equal to the thickness of the gasket to project past the various layers comprising the same. Further, as these protecting flanges are not overlapped with other layers of the gasket the die work is materially simplified. However, these flanges do effectively protect the edges of the various layers of the gasket to thereby prevent damage thereto, especially when the gasket is being clamped in position. Furthermore, I am enabled to provide a protecting flange about the periphery of the gasket without increasing the thickness thereof. A stiffening flange may be formed on the peripheral flange to increase the rigidity of the gasket and prevent detrimental bending thereof and damage thereto.

While I have illustrated and described a preferred form of construction it is to be understood that this is capable of variation and modification and I therefore do not wish to be limited to the precise details set forth but desire to avail myself of such changes and alterations as fall within the spirit and scope of the following claims:

I claim:

1. A gasket having an opening therein and comprising a body of gasket material and a metallic layer on one face of the body, and an upstanding flange on said metallic layer about the edge of the body, the edge of said flange being turned outwardly and disposed substantially in a plane parallel to the metallic layer and offset therefrom.

2. A gasket having a service port and an opening therein and comprising a body of gasket material and a metallic layer on one face of the body, an upstanding flange on said metallic layer about the edge of the body, the edge of said flange being turned outwardly and disposed substantially in a plane parallel to the metallic layer and offset therefrom, a flange on said metallic layer about said service port and overlapped on the adjacent portion of the gasket material, and an upstanding flange on the metallic layer about the opening and terminating substantially flush with the uncovered face of the gasket material.

3. A gasket having a service port and an opening therein and comprising a body of gasket material and a metallic layer on one face of the body, a flange on the metallic layer about said service port and overlapped on the adjacent portion of the gasket material, and an upstanding flange on said metallic layer about the opening and terminating substantially flush with the opposite face of the gasket.

JOHN H. VICTOR.